Nov. 28, 1967 G. WIGGERMANN 3,354,709
HYDROSTATIC TORQUE-MEASURING DEVICE
Filed April 19, 1965 2 Sheets-Sheet 1
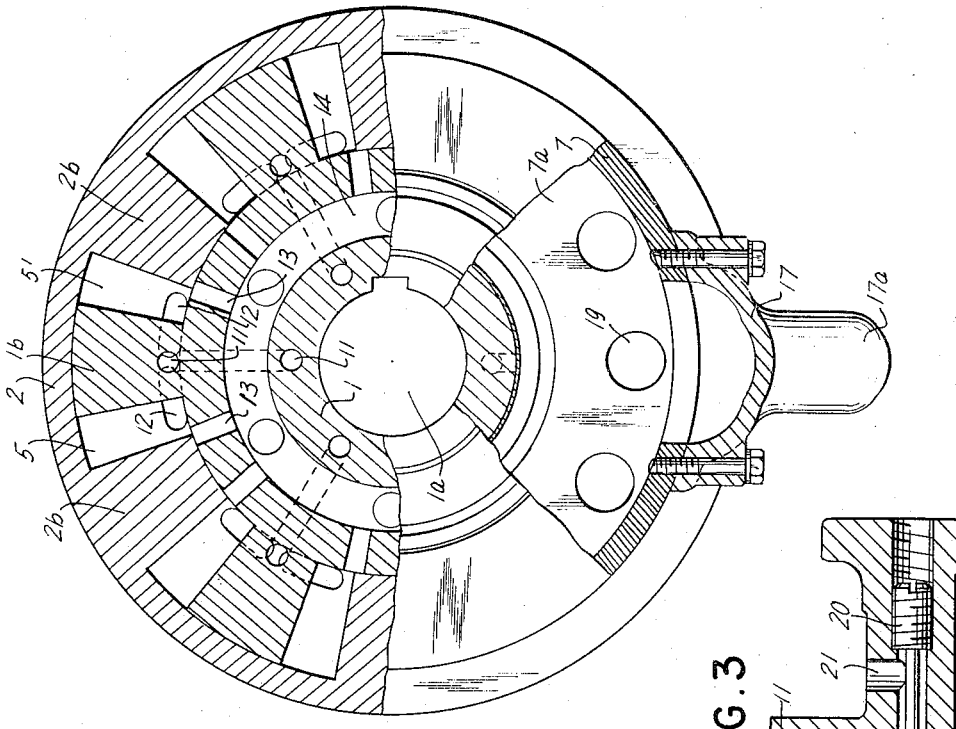
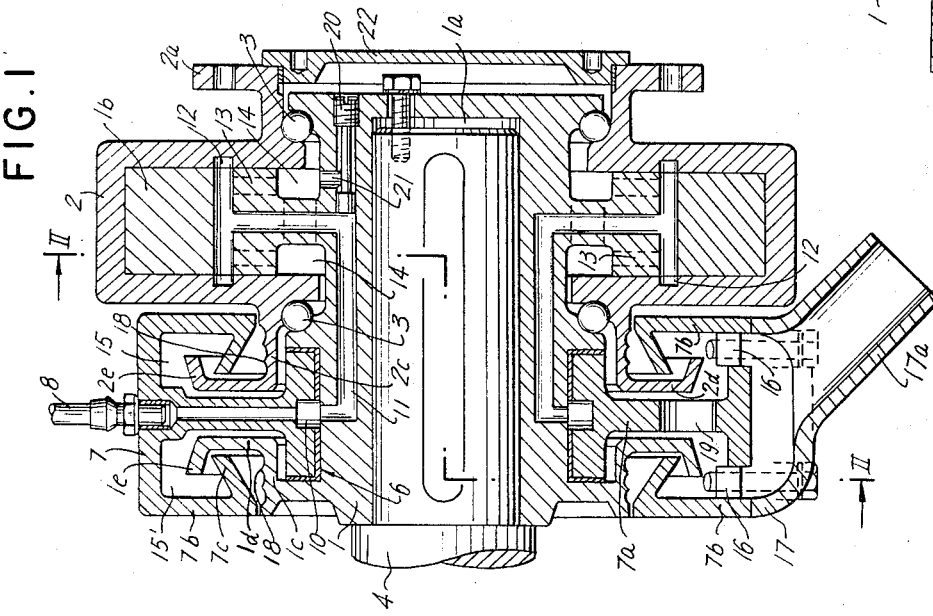

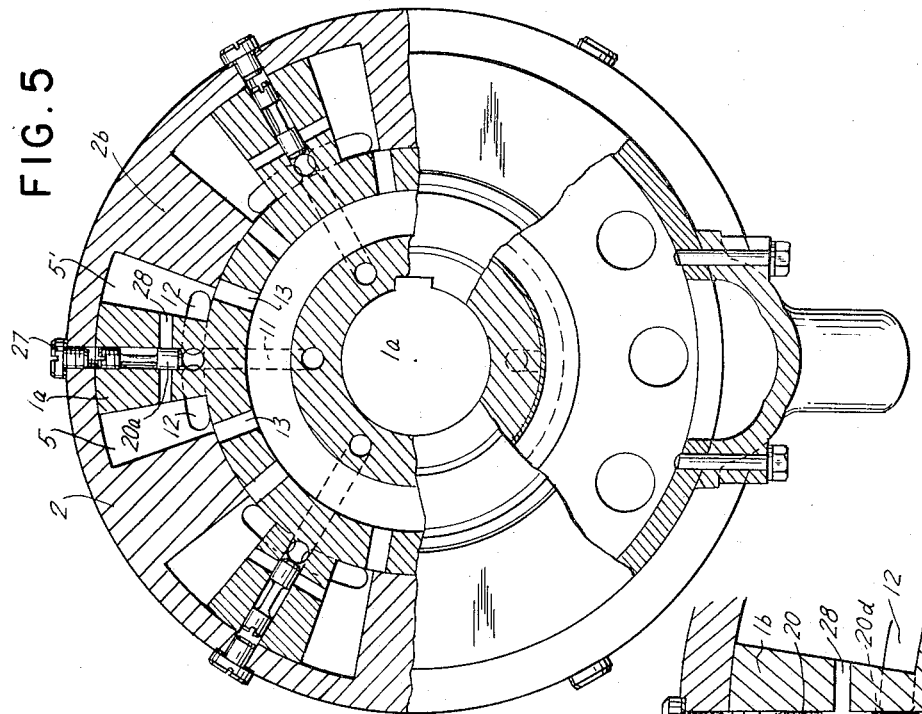
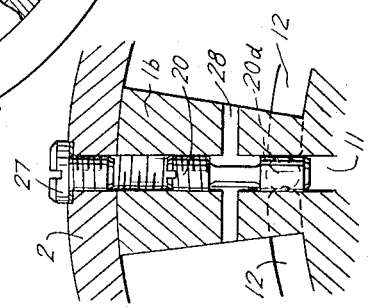
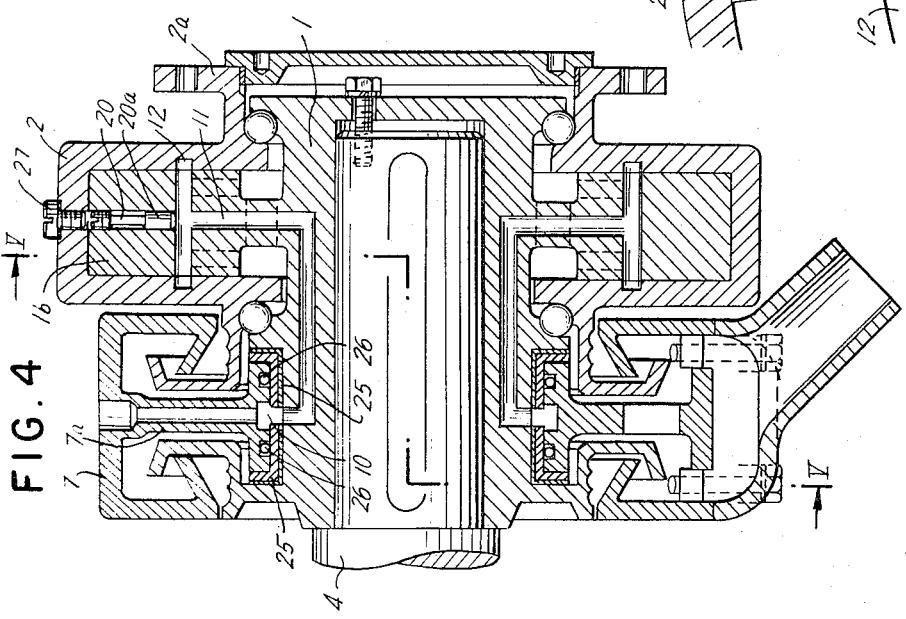

United States Patent Office 3,354,709
Patented Nov. 28, 1967

3,354,709
HYDROSTATIC TORQUE-MEASURING DEVICE
Georg Wiggermann, Kressbronn am Bodensee, Germany, assignor to Reiners & Wiggermann Maschinenfabrik, Kressbronn am Bodensee, Germany, a German corporation
Filed Apr. 19, 1965, Ser. No. 448,997
Claims priority, application Germany, Apr. 20, 1964, R 37,730
14 Claims. (Cl. 73—136)

ABSTRACT OF THE DISCLOSURE

A hydrostatic torque transmitting coupling for torque measuring purposes which includes two relatively rotatable and coaxial rotors rotated one within the other and forming together a system of hydrostatic displacement cells which couple said two rotors to each other and have a variable volume depending upon the relative rotation of the rotors, and a stationary fluid-pressure transmitter forming an annular structure coaxially seated on one of the rotors and having two diametrical side walls axially spaced from each other and a diametrical center wall subdividing the space between the side walls, the center wall having fluid duct means communicating through the one rotor with the cells and having exteriorly accessible means for connection of the duct means to stationary fluid pressure means. Also included are two coaxial centrifugal discs joined with the two rotors to rotate together therewith, the discs being located inside the transmitter on opposite sides of the center wall respectively and each having a conically widened rim portion extending away from the center wall to fling escaping fluid against the inner surface of one of the side walls, the transmitter forming respective collecting chambers for flung-away fluid on the opposite sides of the center wall. The transmitter structure has outlet openings for draining fluid from the collecting chambers.

My invention relates to hydrostatic torque-measuring devices of the type having two rotor-shaped bodies coaxially and rotatably journalled one within the other and connected with each other by hydrostatic displacement cells so as to form a coupling which, as part of a driving transmission or gearing, permits continuously transmitting a torque to a stationary measuring instrumentality, such as a pressure indicating or recording instrument.

Torque-transmitting devices of this kind comprises a non-rotating transmitter portion which essentially constitutes a glide bearing and serves to transmit the measuring pressure from the rotating members to the stationary portion of the equipment. The transmitter portion comprises a cylindrical bearing pin on which the measuring coupling is rotatably seated with slight clearance. The pin has an annular groove registering with radial ports of connecting channels, so that all of the displacement cells are always under the liquid pressure obtaining in the annular groove. The annular groove of the transmitter is connected by flexible or stationary tubing with the source of hydraulic pressure, as well as with the stationary pressure-measuring instrumentality (German Patent 1,097,717).

The measuring principle of such hydrostatic couplings, in comparison with other, for example electrical, torque-measuring devices, affords various advantages. It secures an always uniform high sensitivity of response and a high measuring accuracy. The measuring pressure is proportional to the torque, so that simple measuring and recording devices can be used. Hydrostatic measuring couplings are insensitive to temperature and weather. It is easy to mount and remove them, and they permit maintenance by unskilled personnel.

Heretofore, however, hydrostatic measuring couplings have not met with the originally expected acceptance in industrial practice. This is to be ascribed to the fact that the known designs of such couplings secure the above-mentioned advantages at the expense of severe disadvantages. Their over-all length is disproportionately large so that these couplings cannot simply be exchanged for a normal coupling. The outer diameter, and consequently the momentum, is undesirably large for many purposes. In addition, the known hydrostatic couplings can be used only when mounted with their axes in horizontal position, because otherwise the transmitter structure does not secure a leak-free drainage of the pressure fluid. Furthermore, a measuring error is observed whose magnitude depends upon the speed of rotation. In many cases, the known hydrostatic measuring couplings cannot be built into transmissions or gearings because the operating conditions or limitations to be satisfied at the glide bearing of the transmitted structure do not permit operating at a sufficiently high speed of rotation.

It is an object of my invention to devise a hydrostatic measuring coupling which affords being used universally by insertion in any desired position or orientation into a power transmission train, and which permits operation at high speed of rotation with improved reliability and accuracy of measuring performance.

Another, more specific object of the invention, relating to the applicability of the measuring coupling in any desired mounting position, is to design it in such a manner that it forms a labyrinth-type seal for the pressure-fluid transmitter.

According to the invention, each of the two coaxially rotatable rotors of a hydrostatic measuring coupling is provided with a circular centrifugal disc located within the pressure-fluid transmitter, and each of these discs has a funnel-shaped rim portion with a sharp peripheral edge from which the fluid is flung into an annular collecting chamber formed by the transmitter structure.

According to another feature of the invention, the housing wall of the transmitter structure is provided with respective funnel-shaped inner portions of which each extends toward the center wall or partition of the transmitter into the annular space located within the above-mentioned funnel-shaped rim portion of the adjacent centrifugal disc. The collecting chambers of the transmitter structure are given at least one outlet opening adjacent to the respective two lateral walls of the transmitter structure to form a passage for the pressure fluid to drain from the collector chambers to a storage tank or sump.

The hydraulic liquid escaping axially out of the bearing inside the collector structure, as well as the liquid flowing back from the cell system, is flung by the centrifugal discs against the outer wall of the transmitter structure to enter into the collecting chambers, and then issues from the above-mentioned outlet openings. To achieve this also with a vertical mounting position of the coupling, the above-mentioned funnel-shaped inner portions operate as retaining rims. That is, the edge of the inner portion adjacent to the centrifugal disc is located at a somewhat higher point than the drainage level of the appertaining outlet opening. When the coupling is mounted horizontally, the liquid flung away from the discs, drains partly along the periphery of the collecting chambers and partly along the lateral wall of the collecting spaces. In this case, the funnel-shaped inner portions of the transmitter walls operate as collecting grooves for guiding the liquid in the downward direction and thus prevent the liquid from escaping to the outside through the annular gaps between the transmitter structure and the hub member, and between the transmitter structure and the housing.

With a horizontal mounting of the coupling, some difficulty may be encountered during starting-up and stopping as well as shortly after standstill, because when the centrifugal action becomes insufficient or vanishes, the liquid may creep around the sharp edges of the centrifugal discs and the funnel-shaped inner portions of the transmitter walls, and may then ultimately escape through the above-mentioned annular gaps. This, however, is likewise prevented by the funnel-shaped inner rim portion of the collecting chambers. Furthermore, according to another feature of the invention, an annular ridge, or sharp edge is provided around the periphery of the coupling portion located within the funnel-shaped inner portion of the transmitter wall; and these annular ridges or sharp edges block the axial creepage of liquid and cause it to drip into one of the collecting chambers or to the drainage opening of the collector structure.

According to another feature of the invention, the possibility of universal mounting is further promoted by providing a drainage structure which is flanged to the periphery of the collecting structure and possesses a drainage outlet 45° inclined toward the axis of rotation of the coupling. The fastening is such that the drainage structure can be mounted in a selected angular position, namely so that in any possible mounting position of the coupling, the drainage tube will always point in the downward direction.

The above-mentioned funnel-shaped inner rim portion of the transmitter walls, in order to be effective as collecting channels in any mounting position of the coupling, require giving the collector structure a given minimum length in the axial direction. According to another feature of my invention, the axial over-all length of the measuring coupling thus required, is minimized by giving at least the one collecting chamber that is adjacent to the coupling housing of the displacement cells, such a large diameter that it fully surrounds the neck portion of the appertaining rotor body inclusive of the one antifriction bearing located at this place. Furthermore, this collecting extends as closely as feasible to the adjacent lateral wall of the coupling proper, with the exception of a residual narrow gap.

Further improvement features of the invention serve to contribute to the desired reduction in over-all dimensions and to permit increasing the permissible speed of rotation. In this respect the invention is predicated upon the recognition that the heretofore customary flange connections at both sides of the torque-transmitting coupling is an essential reason for the undesired large over-all length. According to a further feature of the invention, therefore, one of the two rotor structures of the fluid coupling is designed as a hollow hub member and only the other rotor structure is provided with a connecting flange in the conventional manner.

This permits shoving the measuring coupling directly upon the take-off shaft or stub shaft of a driving engine or other prime mover. The elimination of the intermediate flange connection heretofore necessary, thus affords an appreciable shortening of the over-all length in the axial direction. In other words, the coupling itself now takes the place of the conventional coupling flange. The coupling also permits being driven at its periphery by means of a spur-gear, a chain, belt, or any other suitable drive means. A reduction in the dynamic moment and the reduction in cost constitute further advantages of the tubular hub structure.

Further improvements in this respect are obtainable according to the invention by providing for a highest feasible pressure level of the hydraulic working medium in the displacement cells. This affords reducing the size of the pressure surfaces required for transmitting a given torque, and consequently reducing the outer dimensions of the displacement system. The resulting increase of the losses of pressure liquid at the glide bearing of the transmitter could be compensated by narrowing the clearance in the bearing. On the other hand, reliable operation at an increased permissible speed of rotation would require an increase in bearing clearance. Therefore, the invention also provides structural means which satisfy both requirements. In this sense, and in accordance with a further feature of the invention, a main portion of the throttling effect, which determines the quantity of leakage losses, is placed away from the transverse bearing to two guide surfaces on the respective axial ends of the glide bearing. At these two localities, there are provided axially displaceable guiding and sealing means which are loaded by the measuring pressure.

These guiding and sealing means, according to a more specific feature of the invention, consist of at least one, preferably two, bearing bushings which are shoved into the bore of the transmitter bearing from the two axial sides respectively. At their respective peripheries, the bushings are sealed by means of elastic sealing means, for example O-rings of elastomer material, which permits axial displacement of the bushings. Each of the bushings has a radial shoulder which, in the inserted condition of the bushing, is located between the end face of the transmitter bearing and the adjacent guiding surface at the hub member of the measuring coupling.

Preferably the width of the transmitter bearing, inclusive of the shoulder portions of the two bushings, is so dimensioned that the total width between the two axial guiding surfaces of the rotor structure affords a sufficient axial clearance even at high speeds of rotation. Simultaneously, this clearance is affected by the measuring pressure which presses from the annular groove of the transmitter bearing upon the inner axial end face of each bearing bushing.

The ratio of the inner end face of the bearing facing to the surface of gliding engagement at the outer shoulder of the bushings is so dimensioned that the measuring pressure automatically limits the gap width of the axial guiding bearings to the required thickness of the lubricant film.

As a result, the axial throughput of liquid is minimized mainly by the action of the guiding surfaces at the axial ends of the transmitter bearing, and the cylindrical portion of the glide bearing is given the clearance required for reliable operation at high speed of rotation.

The indication of the measuring pressure and consequently of the torque is effected by pressure-measuring instruments, for example manometers or the like. The measuring accuracy of the measuring coupling is directly dependent upon the sensitivity of these instruments. The sensitivity always amounts to a given percentage of the highest value on the manometer scale. Consequently, the absolute measuring error increases with decreasing torque or measuring pressure, and vice versa. A remedy has been sought by selectively connecting with the measuring pressure a number of manometers having respectively different measuring ranges. This is expensive and intricate.

According to another feature of my invention, therefore, the measuring coupling is provided with a control device which affords selectively varying the number of the displacement cells subjected to the measuring pressure. More specifically, I provide a three-way piston slider in individual bores leading to the displacement cells, the piston slider connecting the appertaining displacement cell either with the pressure-fluid channel leading to the transmitter or with a pressure-free drainage channel. For a given number of displacement cells, the same pressure-measuring instrument then permits dividing the total measuring range into several partial ranges of the same indicating accuracy. For example, if a measuring coupling is rated for maximal 100 kpm. at 20 atmospheres (superatmospheric) indicated pressure, and possesses a total of five displacement cells, then for a constant measuring pressure of 20 atmospheres, the measuring range is reduced by 20 kpm. for each disconnected displacement cell. Thus, if only a single displacement cell is switched on, the manometer, subjected to the same load for any of the available ranges, will indicate the measuring range of 4 to 20 kpm. with the same accuracy as the range of 20 to 100 kpm. which is effective when all five displacement cells are active.

Relative to the arrangement of the above-mentioned control pistons, the invention affords two different possibilities. According to one of them, the pressure-fluid ducts in the rotor structure designed as a hub member have respective duct portions parallel to the rotor axis and the control pistons are arranged in the respective duct portions so as to be adjustable from the axial side of the measuring coupling. Preferably, each control piston is in threaded engagement with the duct and has a slit to be reached by a screw driver or similar tool, so that the plug can be screwed axially into one or the other switching position.

In cases where the torque is supplied to, or taken off, the coupling by peripherally acting drive means, for example by a spur-gear, chain or belt, the piston arrangement just described is easily serviceable, since the axial side of the measuring coupling is always accessible upon removal of an oil-tight lid or cover.

However, if the measuring coupling is built into a through-transmission, the axial end side of the coupling is accessible only after removing one of the coupling connections. With such an arrangement of the measuring coupling, the displacement cells can be made selectively controllable by placing the above-described control piston into radially extending portions of the pressure-fluid bores of the hub member. In this case a bore is provided on the periphery of the rotor, for example on the periphery of the housing, through which the piston in the bore is accessible by means of a screw driver or other tool. The bore is preferably closed toward the outside by a screw plug. With such a design, the displacement cells can be readily and selectively switched on or off, regardless of the particular manner in which the measuring coupling is built into a torque-transmitting train of mechanisms.

It depends only upon the desired measuring accuracy whether all of the displacement cells or only some of them are to be provided with the above-described control pistons so as to be selectively placed in active or inactive condition.

According to another feature of the invention, the measuring accuracy can be further improved. A study of the possible causes of measuring errors has shown that the position of the inlet and outlet openings in the individual displacement cells should not be chosen at random.

According to the invention, these inlet and outlet openings are located at substantially the same radial distance from the rotor axis. Otherwise the flow of liquid through the cell is subjected to Coriolis acceleration which increases with the square of the rotating speed and exerts upon one wall of the cell a tangential force affecting the accuracy of the measuring result.

The invention will be further described with reference to embodiments of hydrostatic measuring couplings according to the invention illustrated by way of example on the accompanying drawings, in which:

FIG. 1 shows a first coupling in longitudinal section.

FIG. 2 is a partly sectional front view of the same coupling, the section being taken along the line II—II in FIG. 1.

FIG. 3 shows a detail of FIG. 1.

FIG. 4 shows another measuring coupling in longitudinal section.

FIG. 5 is a part-sectional front view of the same coupling, the section being taken along the line V—V in FIG. 4; and FIG. 6 shows a detail of FIG. 4.

Functionally corresponding elements are denoted by the same respective reference characters in all illustrations. Parts which together form a single piece or are rigidly connected with each other are identified by an affixed lowercase letter; thus, in FIG. 2 the parts denoted by 7, 7a, 7b, 7c form together a rigid structure when assembled.

The measuring coupling shown in FIGS. 1 to 3 comprises two coaxially rotatable rotor structures namely a hub member 1 and a housing 2, with intermediate ball bearings 3. The hub member has a central bore 1a and is stuck directly upon the take-off shaft 4 of a driving engine or the like prime mover. The housing 2 has an integral flange 2a through which the torque is transmitted to the machine or other equipment whose torque is to be measured. The hub member 1 (FIG. 2) forms vanes 1b radially extending in the outward direction. The housing 2 has inwardly directed vanes 2b which, together with the vanes 1b, form intermediate variable displacement chambers or cells 5, 5'. In the event of relative rotation between hub member 1 and housing 2, the cells 5 and 5' increase and decrease respectively their volume in mutually opposed sense.

A fluid transmitter structure 7 of annular shape is rotatably seated on the hub member 1 by means of a glide bearing 6 and serves to supply the displacement cells 5, 5' with hydraulic fluid from a stationary source of pressure fluid (not illustrated). The pressure fluid enters through a flexible hose 8 (FIG. 1) and passes through a bore 9 and an annular groove 10 of the transmitter structure 7, thence through bores 11 in hub member 1 and through inlet slots 12 milled into the side walls of the housing 2 to reach the displacement cells 5, 5'. All of the bores 11 communicate with the annular groove 10 so that there is always a continuous hydraulic communication from the flexible hose 8 of the non-rotating transmitter 7 to the rotating system of displacement cells.

The pressure fluid supplied to the displacement cells 5, 5' flows through bores 13 and a hollow space 14 of the hub member 1 and further through the bearings 3 to a disc-shaped plate 2d firmly connected with the housing 2 through a tubular neck 2c. Due to centrifugal action the fluid is flung away from the conically widening rim portion 2e of the disc. The rim 2e extends and widens in the direction away from the center wall 7a of the transmitter structure 7 and has a sharp outer peripheral edge so that the fluid is flung into an annular collecting space 15 of the connector member 7.

The side wall 7b of the transmitter 7 is separated from the housing 2 only by a narrow air gap and extends about the bearing 3 and the neck 2c with slight clearance. The side wall 7b has a funnel-shaped inwardly protruding portion 7c on the wall side facing the center wall 7a of the transmitter 7, and the inner portion 7c has a sharp outer peripheral edge. Similarly, the hub member 1 on the side away from the housing 2, has a tubular neck 1c terminating in a centrifugal disc 1d with a sharp-edge rim portion 1e extending in the direction away from the center wall 7a and having a sharp edge at the outermost periphery. The transmitter 7 has another collecting space 15' whose side wall 7b surrounds the neck 1c with slight clearance and likewise possesses a conically widening inner portion 7c which protrudes into the hollow portion of the centrifugal disc 1d and has an outer rim with a sharp peripheral edge.

The pressure fluid emerging axially at the glide bearing 6, flows partly together with the return flow from the displacement cells to the centrifugal disc 2d and partly to the centrifugal disc 1d, so that the fluid is flung into the collecting chambers 15' and 15. The transmitter 7 has outlet openings 16 at the periphery immediately adjacent to the side walls 7b. A collector member 17 is flanged to the transmitter 7 and has a drain outlet 17a of tubular shape inclined 45° and is selectively attachable in such a position that the outlet 17a either points toward the shaft side or toward the side of the flange 2a shown in FIG. 1.

When the coupling is mounted in horizontal position, the transmitter 7 is held by the attached hoses or, if necessary, also by suitable supports or linkages, so that the collecting drain member 17 is located at the bottom as shown in FIGS. 1 and 2. The fluid flung away from the discs 1d, 2d flows, partly along the inner periphery and partly along the side wall 7b, through the outlet openings 16 to the drain tube 17a which may be connected to a flexible hose (not shown) for passing the fluid back to a storage container or a sump to be a recycled to the inlet hose 8. The funnel-shaped centrifugal discs 1e, 2e prevent drops of liquid from reaching the inner space of the inner members 7c from which the liquid might escape through the narrow annular gaps between the transmitter 7 on the one hand, and the hub portion 1 or housing 2 on the other hand. The liquid flowing down along the side walls 7b might escape on a similar path, but the funnel-shaped inner portions 7b constitute collecting grooves which prevent such escape.

Nevertheless, it may occur that when the coupling is brought to a standstill or shortly thereafter, the oil film adhering to the rims of the centrifugal discs, no longer subjected to centrifugal force, will creep along the inner funnel surfaces of portions 7c of the rim portions 1e, 2e and thus may leak through the above-mentioned annular gaps. To prevent this, the two tubular necks 1c, 2c of the hub member 1 and the housing 2 are provided with ring shaped ridges 18 (FIG. 1) which block the seepage of liquid and cause it to drip toward the outlet openings 16 of the transmitter housing.

With a vertical mounting of the measuring coupling there are two possible positions. The transmitter 7 may be located on top, or it may be located at the bottom. In both cases, the one centrifugal disc 1d or 2d located beneath the center wall 7a, together with the conical disc portion 1e or 2e, covers the catch funnel of the inner portion 7c, so that the liquid flung away from the centrifugal disc can reach only the collector space 15 located at the bottom of the coupling. The retaining rim 7c has such a height above the drainage level of the opening 16 of collecting chamber 15, that the liquid will to some extent collect in this chamber and thus prevent any liquid from escaping over the retaining rim 7c into the environment of the coupling. The pressure fluid simultaneously escaping at the front face of the glide bearing 6 then located on top, drains along the hub of the bearing and along the center wall 7a toward the bores 19 and thus likewise reaches the collecting chamber at the bottom.

In the measuring couplings shown in FIGS. 1 to 3 and FIGS. 4 to 6, the inlet slits 12 are entirely located on the inner periphery of the displacement cells 5, 5' and thus are situated at about the same distance from the axis of rotation as the ports of the outlet bores 13 controlled by the vanes 2b. This avoids measuring errors as may occur if the liquid flow passing through the displacement cells 5, 5' travels in these cells on a radial path and thus is subjected to Coriolis acceleration.

The transmitter structure 7 satisfies all requirements by virtue of the centrifugal action, differences in level, the effect of the annular ridges or blade edges 18, and the funnel-shaped collars 7c which cooperate with the transmitter walls and the centrifugal discs in the above-described manner. The drain member 17 is always fastened in such a position that the outlet 17a is downwardly inclined. Hence, the same drain structure 17 is applicable for any mounting position of the coupling.

In the embodiment shown in FIGS. 1 to 3, the bores 11, which extend parallel to the clutch axis, have extensions 11b into which respective control pistons 20 are screwed from the front side of the coupling, for example with the aid of a screw driver. The control piston 20, for example, is adjustable from the position shown in FIG. 1 to the position shown in FIG. 3, and vice versa. Each piston thus operates a three-way valve. In the position shown in FIG. 1, this piston valve connects the displacement cells 5, 5' with the annular groove 10 of the transmitter 7. In the position shown in FIG. 3, the piston valve connects the displacement cells 5, 5' with the lateral bores 21 communicating with the hollow space 14 of the hub member 1. In the position of piston 20 according to FIG. 1, the particular displacement cell controlled by the piston participates in the torque-transmitting operation. In the piston position according to FIG. 3, this cell is continuously in communication with the return path for the pressure medium and therefore remains inactive.

If torques are to be measured that would be indicated in the lower range of the manometric instrument so that the indication would be less accurate, individual displacement cells can be made inactive by means of the respective control pistons 20 so that the measuring pressure is shifted to a higher range, with the result of obtaining a higher degree of measuring accuracy.

The housing of the measuring coupling is provided with a cover 22 on top of the flange 2a. The cover is in threaded engagement with the flange and can be removed to provide for access to the control pistons 20.

The hydrostatic measuring coupling shown in FIGS. 4 to 6 is largely similar to the one described above with reference to FIGS. 1 to 3. The following description, therefore, is substantially limited to the further improvements embodied in the coupling of FIGS. 4 to 6.

The transmitter 7 according to FIGS. 4 and 5 is provided with a different glide bearing. Two bearing bushings 25, each with an outwardly located rim or shoulder portion, are shoved from opposite sides into the bearing bore of the transmitter 7 to be snugly seated on the structure 1. The cylindrical bearing seats are sealed by respective hollow tubular rings (O-rings) 26 of elastic synthetic plastic. A radial shoulder of the bushings 25 serves to laterally guide the transmitter 7 and also provides an essential share of the amount of throttling required for limiting the leakage of pressure medium along the glide faces. This throttling effect is due to the fact that the pressure in the annular groove 10 imposes a sealing force upon the inner end faces of the bushings 25 in the axial direction against the lateral guiding surfaces. The ratio of these latter surfaces to the inner end faces of the bushings 25 is such that the measuring pressure always limits the thickness of the oil film in the lateral guide bearings to an amount sufficient for reliable operation. As a consequence, the throttling of the oil flow along the cylindrical portion of the glide bearing is of lesser significance; and accordingly the clearance in the bearing is made sufficiently large to permit operating the coupling at high speed of rotation, without the danger of damage to the bearing.

The described journalling of the collector 7, for a given or even a smaller flow of pressure medium, permits operating the measuring coupling at a higher measuring pressure and using it for transmitting a correspondingly higher amount of torque. This leads to a reduction in weight, space requirements and dynamic momentum for a given maximal torque.

The embodiment shown in FIGS. 4 to 6 further differs from the embodiment of FIGS. 1 to 3 with respect to the control pistons 20. These are screwed into radial extensions of the respective bores 11 leading to the displacement cells. For adjusting the pistons 20, they are accessible in any chosen mounting position of the coupling through respective bores which are aligned with the bores 11 in the housing 2 and are individually closed by removable screw plugs 27. The pistons 20 in the embodiment of FIGS. 4 to 6 operate as three-way sliders as explained above. In the position shown in FIGS. 4 and 5, the pistons 20 open the communication between the displacement cells 5, 5' and the annular groove 10 of the collector 7, and simultaneously block a bypass bore 28 interconnecting the displacement cells 5, 5', so that the displacement cells participate in the transmission of torque. In the position of control piston 20 shown in FIG. 6, it forms a bypass between the two displacement chambers 5 and 5' and also connects them continuously with return-flow bores 13 of the hub member, while the head portion 20a of the piston 20 blocks the supply of fluid from the channel 11. With this adjustment, the particular displacement cells 5 and 5' controlled by this piston do not participate in the transmission of torque, so that the measuring pressure, if otherwise too low to be accurately responded to, is shifted to a range of increased measuring accuracy.

In both embodiments described above, the number of the displacement chambers, the maximal measuring pressure, and the corresponding transmittable torque are adapted to each other, so that for each adjustable number of simultaneously active displacement cells, the ratio of the corresponding measuring pressure to the corresponding transmittable torque is an integer.

Depending upon the measuring accuracy desired, all of the displacement cells, or only some of them, may be made disconnectable in the above-described manner. It often suffices to divide the maximum measuring range in the ratio 2:1. In this case, only one-half of the displacement cell pairs 5, 5' are to be equipped with the above-described control pistons 20.

Hydrostatic measuring couplings according to the invention satisfy all mounting requirements and possess minimized over-all dimensions and small dynamic moments. They permit being operated at high speeds of rotation and secure a high measuring accuracy over the entire measuring range under various operating conditions. By virtue of the particular design of the transmitter bearing, the throughput of liquid is minimized and the circulating amount of liquid pressure medium is correspondingly reduced.

In comparison with the known hydrostatic measuring coupling, the novel couplings according to the invention afford a more universal use without increase in the cost of manufacture.

The individual improvement features described in the foregoing are not limited to any particular type of hydrostatic measuring coupling, and are applicable in any desired combination with one another.

It will be obvious, therefore, to those skilled in the art that my invention permits of various modifications and may be given embodiments other than particularly illustrated and described herein, without departing from the essential features of my invention and within the scope of the claims annexed hereto.

I claim:

1. A hydrostatic torque transmitting coupling for torque measuring purposes, comprising two relatively rotatable and coaxial rotors located one within the other and forming together a system of hydrostatic displacement cells which couple said two rotors to each other and have a variable volume depending upon the relative rotation of said rotors, a stationary fluid-pressure transmitter forming an annular structure coaxially seated on one of said rotors and having two diametrical side walls axially spaced from each other and a diametrical center wall subdividing the space between said side walls, said center wall having fluid duct means communicating through said one rotor with said cells and having exteriorly accessible means for connection of said duct means to stationary fluid pressure means, said cells having fluid inlet and outlet means communicating with said fluid duct means and variable in flow area in accordance with the relative rotation of said rotors so that fluid supplied by said stationary fluid pressure means to those cells decreasing in volume due to the relative rotation of said rotors is reduced and to those cells increasing in volume due to said relative rotation is increased whereby pressure of the fluid in said cells decreasing in volume is measurably increased and in said cells increasing in volume is measurably decreased in dependence upon the torque being transmitted, two coaxial centrifugal discs joined with said two rotors to rotate together therewith, said discs being located inside said transmitter on opposite sides of said center wall respectively and each having a conically widened rim portion extending away from said center wall to fling escaping fluid against the inner surface of one of said side walls, said transmitter forming respective collecting chambers for flung-away fluid on said opposite sides of said center wall, and each of said side walls having an inwardly protruding funnel-shaped portion coaxially surrounding said one rotor and widening toward the transmitter periphery and toward said center wall, said inwardly protruding portion extending in axially overlapping relation to, and within the periphery of, the adjacent one of said rim portions, said transmitter structure having outlet openings for drainage of fluid from said collecting chambers.

2. In a hydrostatic torque transmitting coupling according to claim 1, said rim portions of said centrifugal discs and said funnel-shaped wall portions having each a sharp outer peripheral edge.

3. In a hydrostatic torque transmitting coupling according to claim 1, said outlet openings of said transmitter structure being radially spaced from the axis of said rotors a larger distance than the outer periphery of said funnel-shaped wall portions.

4. In a hydrostatic torque transmitting coupling according to claim 1, one of said rotors forming a hub member and the other a housing of larger diameter than said hub member, said housing being coaxially journalled on said hub member anti-friction bearing means interposed between said hub member and said housing, said housing having a neck protruding axially from said housing over one of said bearing means and being joined with one of said centrifugal discs, said transmitter structure being seated on said hub member in axial proximity to said housing and surrounding said neck.

5. In a hydrostatic torque transmitting coupling according to claim 4, said hub member having an axial center bore for direct engagement with a drive shaft.

6. In a hydrostatic torque transmitting coupling according to claim 1, one of said rotors forming a hub member and the other a housing of larger diameter than said hub member, said housing being coaxially journalled on said hub member, said transmitter structure being seated on said hub member axially adjacent to said housing and forming a glide bearing together with said hub member, said transmitter having within said glide bearing a peripheral groove communicating with said duct means of said center wall, and said hub member having ducts through which said annular groove communicates with said displacement cells.

7. In a hydrostatic torque transmitting coupling according to claim 6, said transmitter having axially displaceable bearing bushings coaxially seated on said hub member and forming part of said glide bearing, said hub member having annular stop-face structures engageable by said respective bushings to limit axial displacement thereof, said bushings having inner end faces under fluid pressure from said groove so as to be forced against said stop-face structures.

8. In a hydrostatic torque transmitting coupling according to claim 7, said bushings having respective elastic sealing means engaging said transmitter structure for preventing escape of fluid while permitting axial displacement of said bushings.

9. In a hydrostatic torque transmitting coupling according to claim 1, said outlet openings of said transmitter structure being located at the periphery thereof and extending in the axial direction from said center wall to said respective side walls.

10. A hydrostatic torque transmitting coupling according to claim 1, comprising a collector member flanged to said transmitter structure at the periphery of the latter to receive fluid from said outlet openings, said collector member being selectively attachable to said transmitter structure in two positions angularly spaced 180° from each other, and said collector having a tubular outlet inclined about 45° to the axis of said rotors.

11. In a hydrostatic torque transmitting coupling according to claim 1, said one rotor having main ducts through which said fluid duct means of said center wall communicate with said respective displacement cells, by-pass ducts for interconnecting and thereby inactivating said respective cells, and selective control means for selectively closing said main ducts and opening said bypass ducts whereby selected ones of said cells are placed in hydraulically inactive condition.

12. In a hydrostatic torque transmitting coupling according to claim 11, said selective control means comprising pistons selectively displaceable between cell-inactivating and activating positions within said respective main ducts.

13. In a hydrostatic torque transmitting coupling according to claim 12, each of said main ducts having a radial portion, said pistons being located in said respective radial duct portions and in threaded engagement therewith so as to be displaceable by turning movement, said radial portions of said ducts being normally covered by screw plugs at the periphery of the coupling, and said pistons being accessible upon removal of said plugs.

14. In a hydrostatic torque transmitting coupling according to claim 1, said displacement cells having fluid inlet and outlet openings spaced substantially equal distances from the axis of said rotors.

References Cited
UNITED STATES PATENTS

| | | | |
|---|---|---|---|
| 2,715,834 | 8/1955 | Chamberlin | 73—136 |
| 3,057,193 | 10/1962 | Wiggermann | 73—136 |

JAMES J. GILL, *Primary Examiner.*

RICHARD QUEISSER, *Examiner.*

C. A. RUEHL, *Assistant Examiner.*